May 3, 1927.  L. OXHANDLER  1,626,870

CUSHIONING AND FILLER LOCKING FLAT

Filed March 29. 1927

Inventor:
Leopold Oxhandler,
By Wm F Freudenreich,
Atty.

Patented May 3, 1927.

1,626,870

UNITED STATES PATENT OFFICE.

LEOPOLD OXHANDLER, OF CHICAGO, ILLINOIS.

CUSHIONING AND FILLER-LOCKING FLAT.

Application filed March 29, 1927. Serial No. 179,386.

The present invention relates to the packaging of fragile articles, particularly eggs, in such a way that they may be handled in the ordinary way and be shipped without danger of breakage. The principal object of the present invention is to produce a flat adapted to be employed with a cellular filler to lock the walls of the same against displacement, cushion an egg or other article lying in each cell, and provide recesses or depressions to hold liquid discharged from an egg in the event that an egg cracks, and localize such liquid in the area forming the bottom of the cell in which that particular egg is located.

There are at present in use flats provided with cup-shaped holders that lock each egg in a fixed position. If a crate of eggs packed between flats of this kind is given a heavy jar, the shells of the eggs must move with the crate, but the liquid contents of the egg shells are not restrained and therefore the inertia thereof tends to remain stationary while the shells are moving, causing a disturbance of the contents which eventually results in the settling of the yokes of the eggs to the bottom and consequent deterioration of the eggs. A further object of the present invention is to produce a simple and novel means of packaging eggs so that each egg will be housed in a secure compartment, be effectively cushioned, but be permitted to play about freely within the compartment so as to avoid the destructive influences arising from the locking of eggs in fixed relation to the crate.

In my prior application Serial No. 112,193 I have shown one form of flat embodying the same general idea as the present invention and, viewed in one of its aspects, the present invention may be said to have for its object to improve on the details of the flat shown in the aforesaid application. The aim in the present application is to cover the particular species of flat disclosed herein, whereas the claims for the generic invention are contained in my said prior application.

Figure 1:
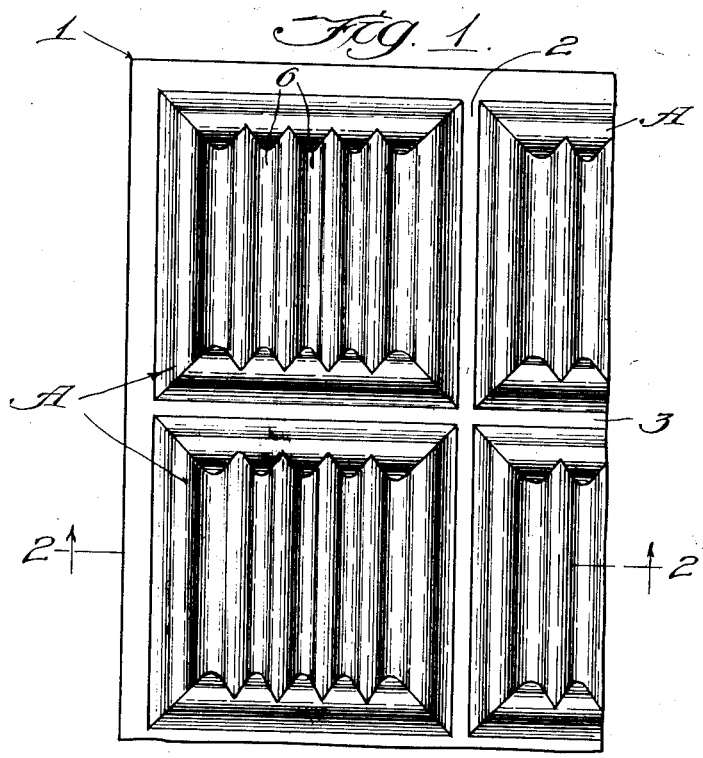
Figure 2:
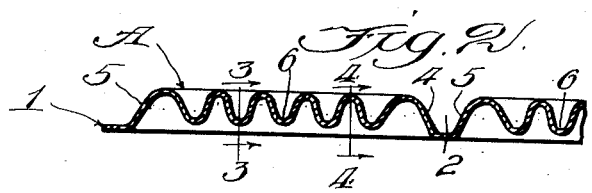
Figure 3:
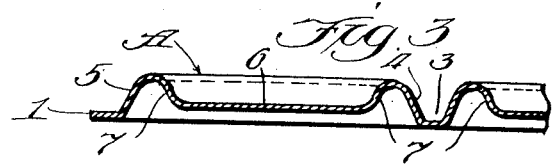
Figure 4:
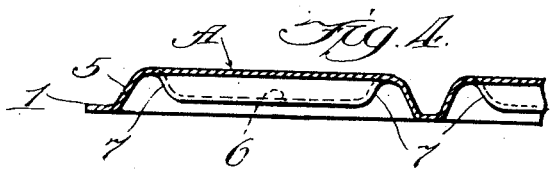

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a top plan view of one corner of a flat arranged in accordance with my invention; Fig. 2 is a section taken approximately on line 2—2 of Fig. 1; Fig. 3 is a section on line 3—3 of Fig. 2; and Fig. 4 is a section on line 4—4 of Fig. 2.

Referring to the drawing, 1 represents a sheet of fibrous material, such as heavy paper of various kinds, embossed or otherwise shaped, preferably in the process of manufacture, to divide it into squares A separated from each other by grooves or troughs 2 and 3 arranged in two series of parallel troughs at right angles to each other. Each trough preferably has comparatively straight upwardly and outwardly sloping sides 4 and 5. The most common use for devices of this kind is in the packaging of eggs, devices serving as flats to separate one layer of eggs from another and to interlock with the cellular fillers. The flats must therefore be made of comparatively soft material to prevent an egg from being cracked when it is dropped into a cell. Consequently if the flat consisted simply of plain plateau-like squares or sections separated from each other by grooves, it would not possess any appreciable commercial value because it would not retain its shape. Furthermore, such a flat would be open to the objection that an egg dropped upon the same might strike an underlying egg with only the comparatively thin paper usually interposed between the eggs. To overcome the objections just named I so shape each plateau or square that it takes the form of a series of small trough-like beams spanning the space between opposite supporting walls for the plateau. By this means each plateau with its supporting side walls is braced and stiffened. Furthermore, an egg lying upon one of the plateaus is always resting on an effective cushion; and, if dropped into place over an underlying egg, there is no danger that either egg will be cracked, because the corrugations will yield more readily than will the shells of the eggs. Furthermore, in the event that there is a cracked egg present at any time, liquid exuding therefrom will run down into the wells or recesses in this particular plateau and will not smear any other portion of the flat. Viewed in one way, each plateau may be said to have therein a series of long parallel depressions 6 that form troughs whose ends 7 connect with the upper portions of the corresponding side walls at the top and gradually recede from these walls toward the bottom. The wells or recesses are placed close together so that the effect is that of deep comparatively narrow corrugations extending from one side wall of a plateau to the opposite side wall. The effect is much the same as though each plateau consisted of a continuous rib in the form of an inverted trough, two opposed ribs being connected together by a series of smaller parallel ribs arranged at right angles thereto.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A flat comprising a sheet of approximately uniform thickness throughout divided into plateau-like sections by intersecting grooves, each section having therein a series of long parallel depressions that separate it into trough-like ribs the ends of which extend downwardly and inwardly from adjacent side walls of the section to reinforce such walls and form cushions for supporting an article to be packaged.

2. A flat comprising a sheet of approximately uniform thickness throughout divided into plateau-like sections by intersecting grooves, each section having therein a series of long parallel depressions that separate it into trough-like ribs closed at the ends, the end walls of the ribs being joined at the top to the upper ends of the adjacent side walls of the section to reinforce such walls and form cushions for supporting an article to be packaged.

3. A flat comprising a sheet of approximately uniform thickness throughout divided into plateau-like sections by intersecting grooves, each section having therein a series of long parallel depressions that separate it into trough-like ribs closed at the ends, the end walls of the ribs being spaced apart from the adjacent side walls of the section and being connected thereto at the top to reinforce such walls and form cushions for supporting an article to be packaged.

4. A flat comprising a sheet of approximately uniform thickness throughout divided into plateau-like sections by intersecting grooves having sloping sides, all of that part of each section lying wholly within the space surrounded by the upper marginal portions of the adjacent side walls of the grooves being formed into deep narrow corrugations parallel with one of said side walls, the corrugations bracing and reinforcing said sides and forming cushions for supporting articles to be packaged and wells to receive and retain liquid that may flow down from such articles.

5. A flat comprising a sheet of approximately uniform thickness throughout divided into plateau-like sections by intersecting grooves having sloping sides, the material of each section lying wholly within the space surrounded by the upper marginal portions of the adjacent sides being displaced from the plane of the top to form with said sides a continuous endless rib in the form of a frame crossed by a series of parallel ribs, the said parallel ribs and the valleys between them lying below the plane of the top of said continuous rib to produce with the latter wells to receive and retain liquid that may flow down from an article resting on said parallel ribs.

In testimony whereof, I sign this specification.

LEOPOLD OXHANDLER.